Oct. 2, 1928.
F. R. PATCH
1,685,864
STONE SAWING MACHINE
Filed Oct. 26, 1926    3 Sheets-Sheet 3
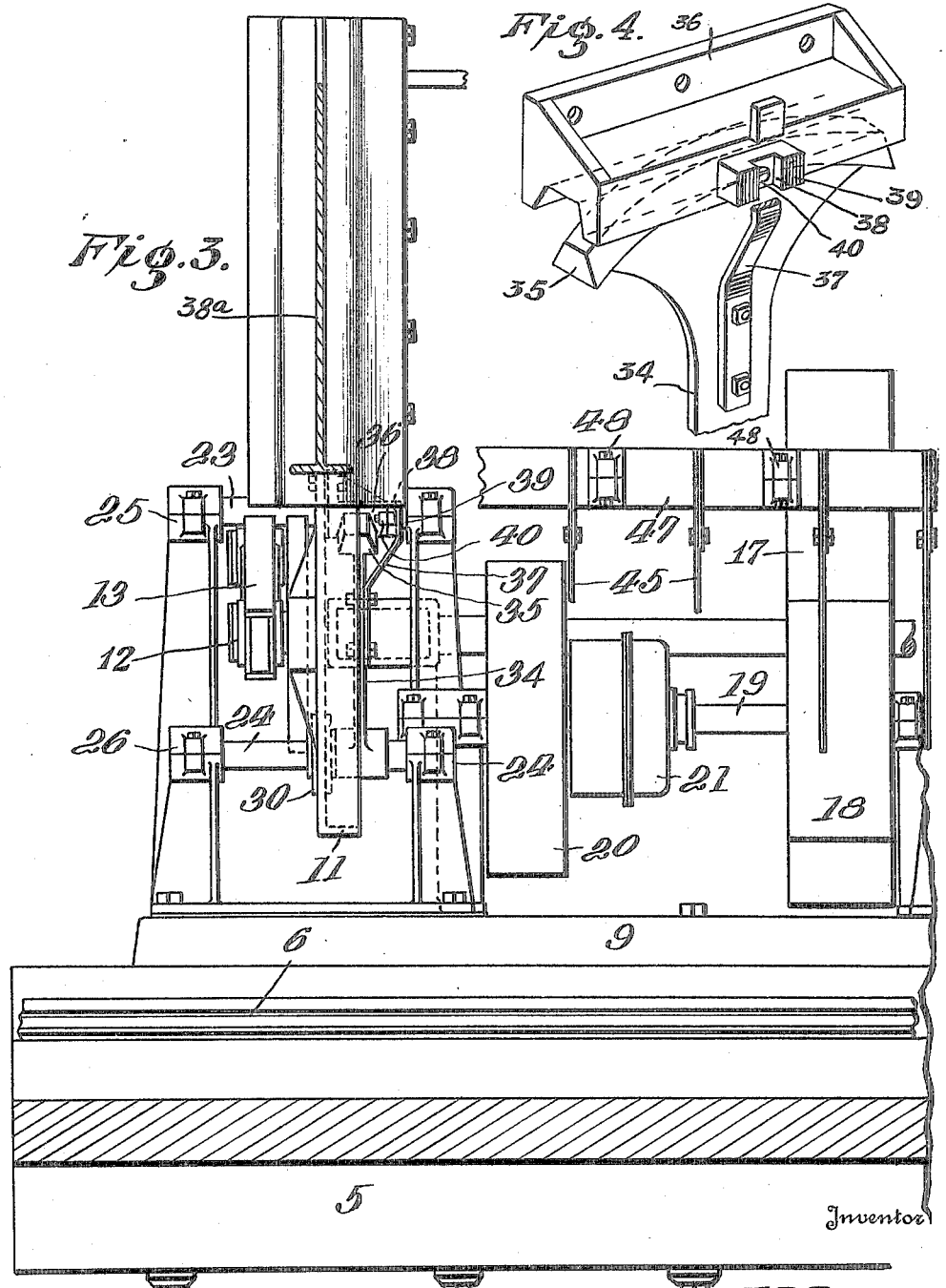
Inventor
F. R. PATCH.
By
Attorney Patented Oct. 2, 1928.

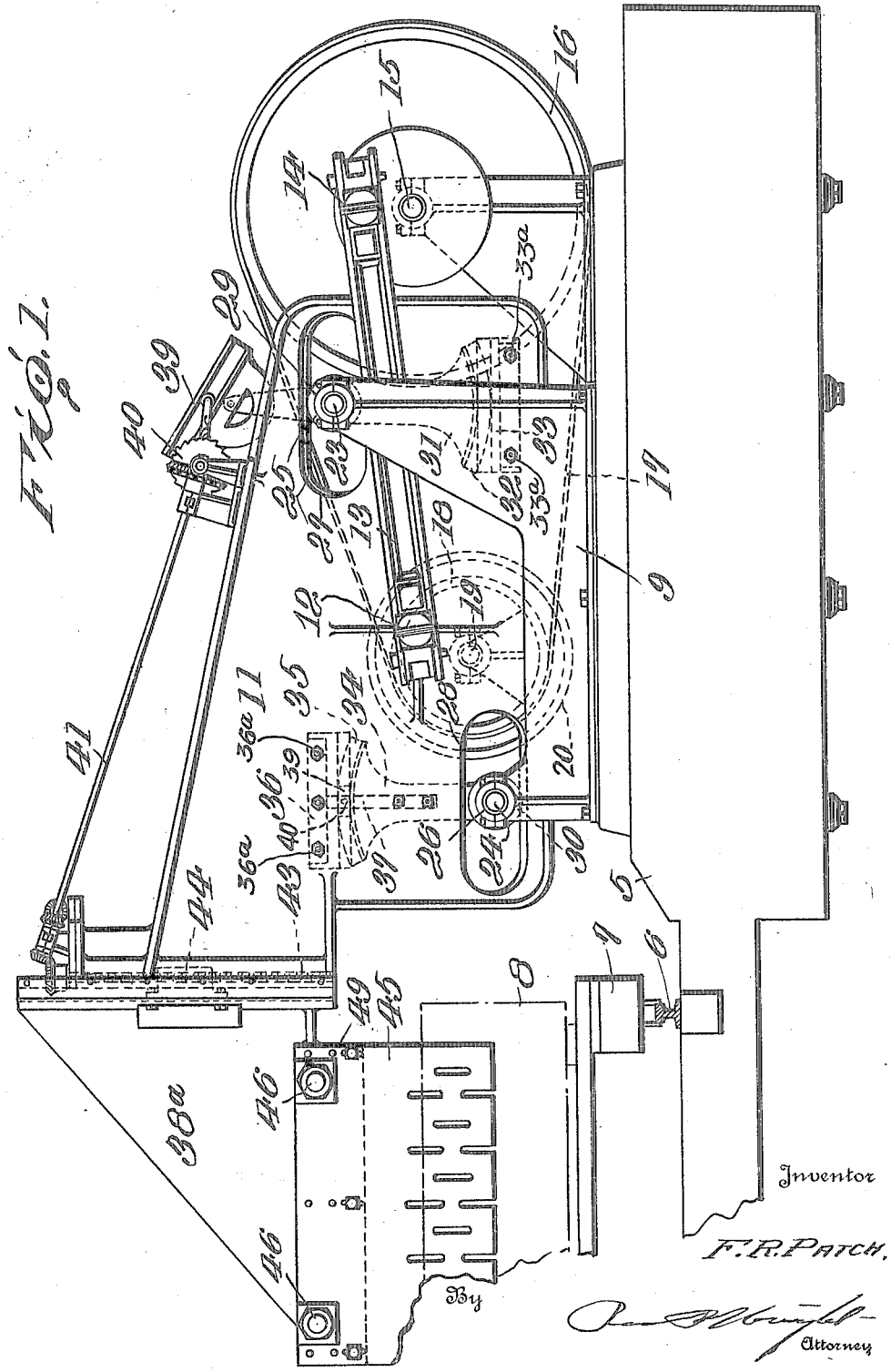

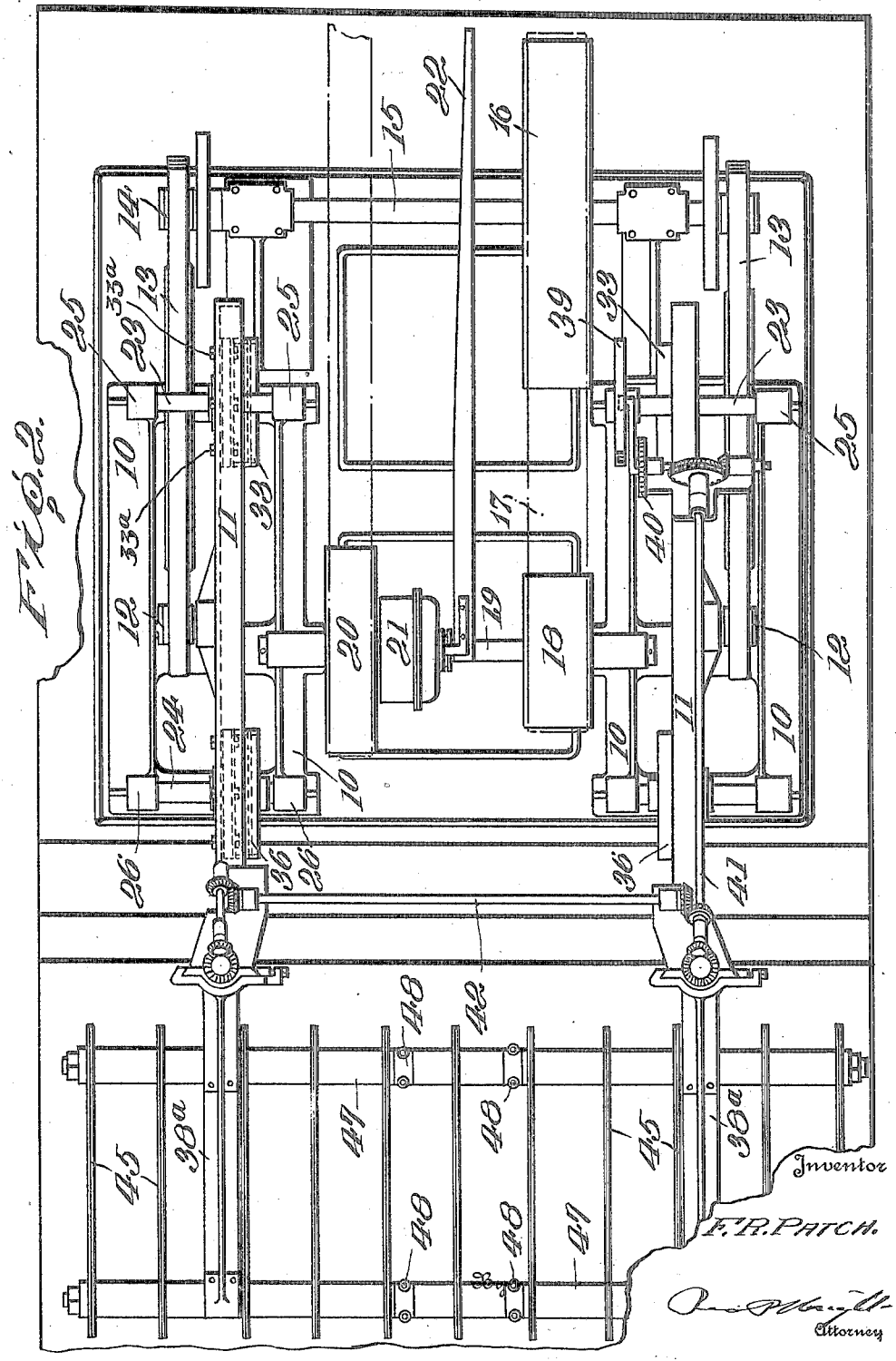

1,685,864

UNITED STATES PATENT OFFICE.

FRED R. PATCH, OF RUTLAND, VERMONT.

STONE-SAWING MACHINE.

Application filed October 26, 1926. Serial No. 144,325.

This invention relates to improvements in stone sawing machines of the type disclosed in my copending application Serial No. 48,259, filed August 5, 1925.

The object of the present invention is the provision of a novel type of mounting for the slide frames carrying the saw feed mechanism and saw blades, whereby to reduce the minimum amount of friction developed incident to reciprocation of the slide frames, and correspondingly reduce the amount of power required to operate the saw and also the amount of wear.

A further object of the invention is the provision of a mounting embodying oscillating rockers and coacting guideways therefor carried respectively by the main stands of the machine base, and the slide frames.

A still further object is the provision of friction reducing rollers interposed between the base stands and reciprocating slide frames for assisting in guiding the movement of the latter.

With these and other objects in view, the invention consists in the novel construction and arrangement of parts as illustrated in the accompanying drawing, in which, Fig. 1 is a side elevation of the sawing machine partly broken away, Fig. 2 is a top plan view of the machine with certain parts omitted to facilitate illustration, and Fig. 3 is an enlarged end elevation, partly broken away and showing one of the saw heads in section.

Fig. 4 is a perspective view of a detail.

Referring to the drawing in detail,

The numeral 5 indicates a suitable foundation supporting the usual track rails 6, over which is movable a carrier or truck 7 supporting the work-piece 8 in position for operation upon by the saw blades of the sawing machine.

The base 9 of the sawing machine is rigidly secured upon the foundation 5, and is provided at its sides with two pairs of spaced bearing stands 10. A slide frame 11 is mounted for reciprocating movement between each pair of stands 10 and is provided with a trunnion 12 engaged in the adjacent extremity of a pitman 13. The opposite extremities of the pitman 13 are engaged over the crank pins 14 of a drive shaft 15, provided with a pulley 16 supporting a power transmitting belt 17. The belt 17 is engaged over a second pulley 18, mounted on the counter-shaft 19, also carrying a driven pulley 20 and clutch device 21, whereby the pulley 20 may be connected with, or disconnected from the shaft 19 at the will of the operator, by means of the clutch lever 22.

The driving mechanism for the slide frames 11, including the shafts 15 and 19, pitman 13 and cooperating parts, is substantially the same as that disclosed in my copending application above referred to.

The present improvement, however, consists in the provision of a novel type of mounting for reducing frictional resistance to the reciprocating movement of the slide frames to the minimum. This means includes upper and lower rocker shafts 23 and 24 mounted in bearings 25 and 26, in each pair of bearing stands 10. The shafts 23 and 24 pass through slots 27 and 28 in the contiguous portions of each slide frame 11, and rollers 29 and 30 are journaled on the shafts, the roller 29 being arranged to engage the top edge of the upper slot 27, and the roller 30 being arranged to engage the lower edge of the lower slot 28.

A depending rocker arm 31 is pivotally mounted upon each upper shaft 23 and is provided with an arcuate lower extremity 32, curved concentrically to the axis of the shaft 23, and engaging in the groove of a guide 33 fixed to the inner side of the frame 11 by means of bolts 33$^a$.

An upstanding rocker arm 34 is pivotally secured to each lower shaft 24 and is provided with an arcuate upper extremity 35 which is wedge-shaped in cross section, as shown in Fig. 3, and engages a groove guide 36, identical with the guide 33. The guide 36 is also fixed to the frame 11, by means of bolts 36$^a$. The extremities 32 and 35, as well as the guide grooves are wedge-shaped in cross section to compensate for wear and to minimize the lateral displacement of the side frames incident to prolonged use.

In order to retain the rocker 35 in proper relation to its guide 36, a supplemental arm 37 is bolted or otherwise rigidly secured to each arm 34 (see Figs. 3 and 4), and its upper end slides in a groove 38 provided in a guide block 39, pivotally secured at 40 to the guide 36, intermediate the ends of the latter. The supplemental arm 37 sliding back and forth through the groove 38 in block 39, as the frame 11 reciprocates, maintains the arm 34 in proper relation to the guide 36, and prevents the rocker from becoming displaced.

The mounting of the saw heads 38ª for vertical movement upon the front ends of the frames 11 and the feed mechanism for the saw heads, including the adjustable guide member 39, pawl and ratchet device 40, geared feed shafts 41 and 42, and the feed screws 43 and nuts 44, is the same as that described in detail in my copending application above referred to, although if preferred, a modified type saw mounting and feed mechanism may be employed.

As also described in my copending application, the saw blades 45 are mounted on the rods 46, provided with the spacing collars 47 and split nuts 48 for clamping and retaining the collars and blade stocks 49 in position.

The present improvement consists essentially, as above stated, in the provision of means for mounting the slide frames in position in the bearing stands 10 in such manner as to reduce the friction developed, incident to the reciprocation of the slides to a minimum, and this object is accomplished by the use of novel arrangement of the rockers 31 and 34, and the coacting guide rollers 29 and 30.

From the foregoing it is believed that the construction, operation and advantages of the invention may be readily understood by those skilled in the art, and it is apparent that changes may be made in the details of the machine without departing from the spirit of the invention as expressed in the claims.

What I claim and desire to secure by Letters Patent is:

1. In a sawing machine, bearing stands, a saw carrying slide frame, rocker shafts mounted in said stands, oppositely arranged guides carried by the frame, and oppositely disposed rockers pivoted on said shafts and coacting with the guides for mounting the frame for reciprocating movement.

2. In a sawing machine, bearing stands, a saw carrying slide frame, rocker shafts mounted in said stands, oppositely arranged guides carried by the frame, and oppositely disposed rockers pivoted on said shafts and coacting with the guides for mounting the frame for reciprocating movement, and means carried by the shafts and coacting with the frame for assisting in guiding the movement of the latter.

3. In a sawing machine, bearing stands, a saw carrying slide frame, rocker shafts mounted in said stands, oppositely arranged guides carried by the frame, and oppositely disposed rockers pivoted on said shafts and coacting with the guides for mounting the frame for reciprocating movement, and means pivotally mounted on the shafts and coacting with the slide frame for assisting in guiding the movement of the latter.

4. In a sawing machine, bearing stands, a saw carrying slide frame, rocker shafts mounted in said stands, oppositely arranged guides carried by the frame, and oppositely disposed rockers pivoted on said shafts and coacting with the guides for mounting the frame for reciprocating movement, and rollers mounted on the shaft and coacting with the slide frame for assisting in guiding the movement of the latter.

5. In a sawing machine, bearing stands, a saw carrying slide frame, rocker shafts mounted in said stands, oppositely arranged guides carried by the frame, and oppositely disposed rockers pivoted on said shafts and coacting with the guides for mounting the frame for reciprocating movement, said slide frame having slots therein, and rollers journaled on said shafts and coacting with said slots to assist in guiding the movement of the frame.

6. In a sawing machine, bearing stands, a saw carrying slide frame, rocker shafts mounted in said stands, oppositely arranged guides carried by the frame, and oppositely disposed rockers pivoted on said shafts and coacting with the guides for mounting the frame for reciprocating movement, and means for retaining the rocker and guide in predetermined relation.

7. In a sawing machine, bearing stands, a saw supporting and actuating slide frame mounted between the stands, upper and lower shafts journaled in the stands, upstanding and depending rockers pivotally mounted upon the lower and upper shafts respectively, and guide members carried by the slide frame and coacting with said rockers.

8. In a sawing machine, bearing stands, a saw supporting and actuating slide frame mounted between the stands, upper and lower shafts journaled in the stands, upstanding and depending rockers pivotally mounted upon the lower and upper shafts respectively, and guide members carried by the slide frame and coacting with said rockers, said guides having grooves therein receiving said rockers, and said rockers and guides being substantially wedge-shaped in cross section.

9. In a sawing machine, bearing stands, a saw supporting and actuating slide frame mounted between the stands, upper and lower shafts journaled in the stands, upstanding and depending rockers pivotally mounted upon the lower and upper shafts respectively, and guide members carried by the slide frame and coacting with said rockers, said slide frame having a slot therein, and rollers carried by the shafts and coacting with the slots to assist in guiding and supporting the frame.

10. In a sawing machine, bearing stands, a saw supporting and actuating slide frame mounted between the stands, upper and lower shafts journaled in the stands, upstanding and depending rockers pivotally mounted upon the lower and upper shafts respectively, and guide members carried by the slide frame and coacting with said rockers, a pivoted guide block carried by one of said guides, and an arm carried by the rocker and slidably engaging the block for maintaining the rocker and guide in predetermined relation to one another.

In testimony whereof I hereunto affix my signature.

FRED R. PATCH.